(12) United States Patent
Takano et al.

(10) Patent No.: US 7,854,178 B2
(45) Date of Patent: Dec. 21, 2010

(54) STRADDLE-TYPE FOUR WHEELED VEHICLE

(75) Inventors: Kiyohito Takano, Kobe (JP); Noboru Meguro, Takasago (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 703 days.

(21) Appl. No.: 11/896,584

(22) Filed: Sep. 4, 2007

(65) Prior Publication Data

US 2008/0060868 A1 Mar. 13, 2008

(30) Foreign Application Priority Data

Sep. 7, 2006 (JP) .......................... P2006-242479

(51) Int. Cl.
*F16H 63/18* (2006.01)
*F16H 63/34* (2006.01)

(52) U.S. Cl. .................................................. 74/337.5
(58) Field of Classification Search ............... 74/337.5, 74/473.22
See application file for complete search history.

(56) References Cited

U.S. PATENT DOCUMENTS

| | | | | |
|---|---|---|---|---|
| 4,574,652 A | * | 3/1986 | Shichinohe et al. ...... | 74/473.21 |
| 4,620,453 A | * | 11/1986 | Kumazawa ................ | 74/473.2 |
| 4,624,350 A | * | 11/1986 | Akashi ........................ | 192/220 |
| 4,635,506 A | * | 1/1987 | Imaizumi et al. .............. | 74/745 |
| 4,658,661 A | * | 4/1987 | Terashita ..................... | 74/331 |
| 4,754,662 A | * | 7/1988 | Misawa .................... | 74/473.22 |
| 4,879,919 A | * | 11/1989 | Sekizaki .................... | 74/337.5 |
| 6,487,927 B1 | * | 12/2002 | Sputhe .................... | 74/473.23 |

FOREIGN PATENT DOCUMENTS

JP 2004-161133 6/2004

* cited by examiner

*Primary Examiner*—Sherry Estremsky
(74) *Attorney, Agent, or Firm*—Wenderoth, Lind & Ponack, L.L.P.

(57) ABSTRACT

A straddle-type four wheeled vehicle according to the present invention includes: a gear-type transmission capable of switching forward/backward traveling gears; a change drum, which is disposed substantially in parallel to a crankshaft of an engine and is turned at every predetermined angle to thus change the gear of the gear-type transmission; and a reverse lock device. The reverse lock device has: a stopper rotated integrally with the change drum; a reverse lock pin disposed substantially perpendicularly to an axial direction of the change drum and capable of moving in a direction of a pin length between a lock position, at which the reverse lock pin is locked to the stopper so as to prevent the change drum from being rotated to a backward traveling position, and an unlock position, at which the reverse lock pin is unlocked from the stopper; and an unlocking transmission mechanism for moving the reverse lock pin to the unlock position.

2 Claims, 7 Drawing Sheets

STRADDLE-TYPE FOUR WHEELED VEHICLE

BACKGROUND OF THE INVENTION

1. Field of the Invention

The present invention relates to a straddle-type four wheeled vehicle provided with a gear transmission capable of changing a gear arrangement among several forward states and a backward state by operating a change pedal, and a reverse lock device for preventing the change to the backward state.

2. Description of the Related Art

In general, a straddle-type four wheeled vehicle of this type is configured such that a gear transmission is shifted up by pushing up a change pedal by a foot of a rider, conversely, the gear transmission is shifted down by pushing down the change pedal by the foot. A neutral state of the gear transmission is set between a forward first speed state and a forward second speed state in a shifting operation, therefore the gear transmission is shifted to the backward state by further pushing down the change pedal from the forward first speed state. In order to prevent any erroneous operation to the backward state, there is provided a reverse lock device for preventing the gear transmission from shifting from the forward first speed state to the backward state. In the case, the gear transmission can be shifted to the backward state by unlocking the reverse lock device.

FIG. 8 shows one example of a conventional reverse lock device in a straddle-type four wheeled vehicle. A change drum 201 is accommodated in a transmission case 200 integrally formed at a rear portion of a crankcase (not shown) of an engine. A lever chamber 203 for reverse lock is defined by using the outside of a generator cover fixed onto a side wall of the transmission case 200. The reverse lock device is constituted of an outer lever 205 arranged in the lever chamber 203; an annular stopper 210 fitted around an axial end 201a of the change drum 201; an inner lever 212 capable of locking and unlocking a locking portion 211 formed on the stopper 210; a rotating shaft 214 having the inner lever 212 and the outer lever 205 securely fixed thereto; and a transmission cable 215 connected to the tip of the outer lever 205. The inner lever 212 is urged by a return spring 216 in the direction indicated by an arrow L1, to thus abut against the outer peripheral surface of the stopper 210.

The change drum 201 shown in FIG. 8 is located at the forward first speed position corresponding to the forward first speed state of the gear transmission. When the change drum 201 is rotated by a predetermined angle from the above-described position (forward first speed position) in the direction indicated by an arrow D, the change drum 201 is moved to the backward position corresponding to the backward state of the gear transmission. Here, the locking of the tip of the inner lever 212 to the locking portion 211 at the forward first speed position can prevent the change drum 201 from rotating in the direction indicated by the arrow D, that is, can prevent any shift to the backward state (the backward state).

When the gear transmission is shifted to the backward state, the outer lever 205 is rotated in the direction indicated by an arrow L2 via the transmission cable 215 by operating an unlocking operating unit (not shown) such as an unlocking lever. As a consequence, the rotating shaft 214 and the inner lever 212 are rotated in the direction indicated by the arrow L2, so that the tip of the inner lever 212 is unlocked from the locking portion 211, thus unlocking the reverse lock.

Besides the above-described conventional example, Japanese Patent Application Laid-open No. 2004-161133 discloses a straddle-type four wheeled vehicle provided with a V belt-type continuously variable transmission, in which a change operating unit for changing a gear arrangement of a gear transmission is disposed in the vicinity of a grip of a handle bar and includes a reverse lock device.

The reverse lock device shown in FIG. 8 includes the lever chamber 203 defined by the generator cover fixed onto the side wall of the transmission case 200, the two levers 205 and 212, and the rotating shaft 214, both of the levers 205 and 212 being rotated around the axis of the rotating shaft 214 within a predetermined range of a turn track. Therefore, a large space for disposing the reverse lock device is needed sideways of the transmission case 200, and further, the number of component parts becomes greater. In other words, not only the size but also the weight of the engine is increased, with an attendant disadvantage of the increased cost of component parts.

SUMMARY OF THE INVENTION

The present invention addresses the above-described condition, and an object of the present invention is to provide a straddle-type four wheeled vehicle, in which a reverse lock device can be compactly disposed, and further, the number of component parts of the reverse lock device can be reduced, thus achieving reduction in cost as well as in size and weight of the engine.

According to the present invention, a straddle-type four wheeled vehicle includes: a gear transmission capable of changing a gear arrangement among several forward states and a backward state; a change drum disposed substantially in parallel to a crankshaft of an engine and rotating at every predetermined angle to change the gear arrangement of the gear transmission; and a reverse lock device. The reverse lock device comprises: a stopper rotated integrally with the change drum; a reverse lock pin disposed substantially perpendicularly to an axial direction of the change drum and capable of moving in a direction of a pin length between a lock position, at which the reverse lock pin locks the stopper so as to prevent the change drum from rotating to a backward position of the change drum, and an unlock position, at which the reverse lock pin unlocks the stopper; and an unlocking force transmission mechanism for moving the reverse lock pin to the unlock position.

With this configuration, it is possible to reduce the size and weight of the reverse lock device, reduce the number of component parts for the reverse lock device, and achieve the compactness of a space for disposing the reverse lock device, resulting in rendering the straddle-type four wheeled vehicle compact.

According to the present invention, the reverse lock pin may preferably be urged to the lock position by an urging member.

With this configuration, it is possible to automatically return the reverse lock pin to a reversely locked state without any special operation during change from the backward state to the forward state or a neutral state.

According to the present invention, the stopper may preferably be formed integrally with a constituent member of the change drum.

With this configuration, it is possible to further reduce the number of component parts.

According to the present invention, the reverse lock pin may be preferably inserted into a pin inserting hole formed on a side wall of a transmission case which houses the gear-type transmission therein.

With this configuration, it is possible to dispose the reverse lock device in a more compact manner.

According to the present invention, an axial of the change drum may desirably have a projection which projects sideways from a bearing for supporting the change drum, the projection having the stopper.

With this configuration, it is possible to easily form the stopper.

According to the present invention, a contact for detecting a gear change position may preferably be disposed at an axial end surface of the projection.

With this configuration, it is unnecessary to dispose a special contact fixing member.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENT

FIGS. 1 to 7 show an embodiment of a straddle-type four wheeled vehicle provided with a reverse lock device according to the present invention. A preferred embodiment according to the present invention will be described with reference to FIGS. 1 to 7.

[Entire Structure of Straddle-Type Four Wheeled Vehicle]

Figure 1:
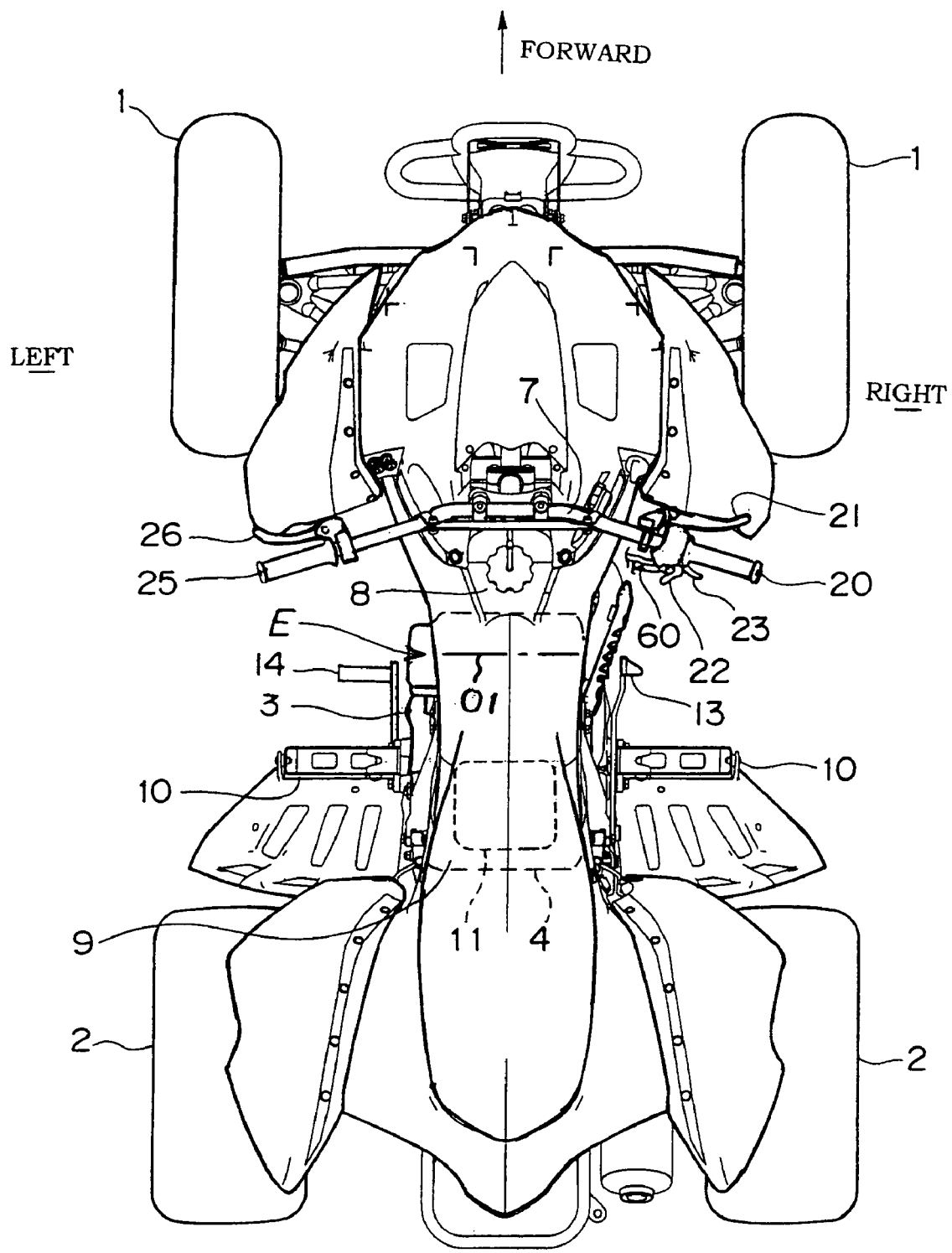
FIG. 1 is a plan view showing a preferred embodiment of a straddle-type four wheeled vehicle provided with a reverse lock device according to according to the present invention.

FIG. 1 is a plan view showing the straddle-type four wheeled vehicle. The straddle-type four wheeled vehicle includes a pair of right and left front wheels 1 at a front portion of the vehicle, a pair of right and left rear wheels 2 at a rear portion of the vehicle, an engine E mounted between the front wheels 1 and the rear wheels 2, a handle bar 7 for steering the vehicle, a fuel tank 8, a seat 9 for a rider, and a pair of right and left steps 10 disposed under the seat 9. The handle bar 7, the fuel tank 8 and the seat 9 are arranged in order from the front at an upper portion of the vehicle. The engine E integrally has a transmission case 4 behind a crankcase 3 of the engine E, and a gear transmission 11 is accommodated in the transmission case 4. A foot brake pedal 13 is located in the vicinity of the right step 10 on the right side of the transmission case 4, in contrast, a change pedal 14 is located in the vicinity of the left step 10 on the left side of the transmission case 4. A crankshaft (indicated by a center line O1) of the engine E is set in a vehicle width direction, that is, in a lateral direction.

A right handle grip 20 is mounted on a right end of the handle bar 7. A front brake lever 21, a reverse unlock lever 22 and a throttle lever 23 are disposed together near the right handle grip 20 on the handle bar 7. In contrast, a left handle grip 25 is mounted on a left end of the handle bar 7, and a clutch lever 26 is disposed near the left handle grip 25 on the handle bar 7.

[Outline of Gear Transmission]

Figure 2:
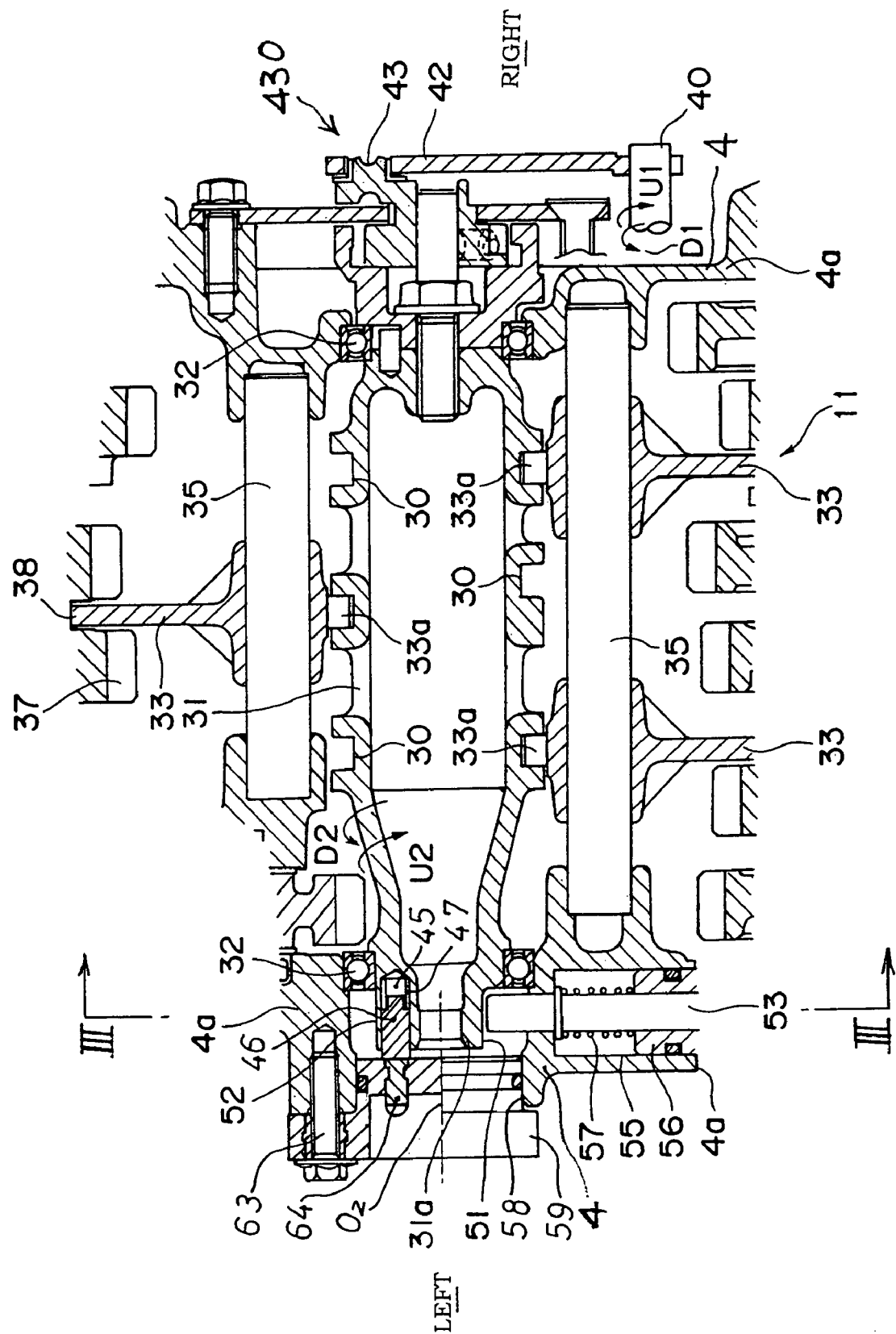
FIG. 2 is a horizontal cross-sectional and enlarged view showing a change drum in a gear transmission in the straddle-type four wheeled vehicle of FIG. 1.

FIG. 2 is a horizontal cross-sectional and enlarged view showing the vicinity of the change drum in the gear transmission 11. The gear transmission 11 is configured in such a manner as to vary a gear arrangement (a meshed state) of the change gears by using a change drum 31 having a plurality of cam grooves 30 formed on an outer peripheral surface thereof, thereby achieving shift-up or shift-down. The change drum 31 is accommodated in the transmission case 4 in such a manner as to laterally extend substantially in parallel to the crankshaft (i.e., the center line O1 in FIG. 1), and further, is rotatably supported on right and left side walls 4a of the transmission case 4 via right and left bearings 32. A drive pin 33a of each of a plurality of shift forks 33 is fitted into each of the cam grooves 30 of the change drum 31. Each of the shift forks 33 is fitted to a shift rod 35 disposed substantially in parallel to the change drum 31 in a manner movable in a direction of a shift rod length, and further, is fitted into an annular groove 38 of a specific change gear 37. As a consequence, each of the shift forks 33 is selectively moved in the direction of the shift rod length by rotating the change drum 31 at every predetermined angle (e.g., 60°), so that the gear arrangement (the meshed state) of the gear transmission 11 is varied, thereby achieving the shift-up or the shift-down.

A swing mechanism 430 for rotating the change drum 31 at every predetermined angle is provided at the right end of the change drum 31. The swing mechanism 430 is constituted of a change shaft 40 connected to the change pedal 14 (FIG. 4) and extending laterally in parallel to the change drum 31, a swinging arm 42 securely fixed to the right end of the change shaft 40, a fitting pin 43 rotatably fitted to the tip of the swinging arm 42 and connected to the change drum 31 via a ratchet, and the like. Specifically, the change shaft 40 is rotated by the predetermined angle in the direction indicated by an arrow U1, thereby swing the swinging arm 42, so as to rotate the change drum 31 by the predetermined angle in the direction indicated by an arrow U2 via the swing mechanism 430. To the contrary, the change shaft 40 is rotated by the predetermined angle in the direction indicated by an arrow D1, thereby swinging the swinging arm 42, so as to rotate the change drum 31 by the predetermined angle in the direction indicated by an arrow D2 via the swing mechanism 430.

The gear arrangement of the gear transmission 11 can be shifted among several forward speed states and a backward state. The gear transmission 11 is sequentially shifted down from a forward fifth speed state, a forward fourth speed state, a forward third speed state, a forward second speed gear, a forward first speed state (low state) and the backward state by rotating the change drum 31 at every the predetermined angle in the direction indicated by the arrow D2, in contrast, the gear arrangement of the transmission 11 is sequentially shifted up from the backward state, the forward first speed state, the forward second speed state, the forward third speed state, the forward fourth speed gear and the forward fifth speed state by rotating the change drum 31 at every the predetermined angle in the direction indicated by the arrow U2. In addition, a neutral state is set between the forward first state and the forward second speed state.

A left shaft end 31a of the change drum 31 projects leftward from the left bearing 32. A contact pin 46 for detecting a gear change position is disposed at the shaft end 31a. The contact pin 46 is fitted into a pin accommodating hole 45 formed at the left shaft end 31a in a manner movable substantially in parallel to the axis of the change drum 31, and further, is urged leftward by a spring 47. In the meantime, an inspection window 58 is formed on the left side wall 4a of the transmission case 4 facing the shaft end 31a from the left side. A closing member 59 is detachably attached to the inspection window 58, to be fixed onto the left side wall 4a via a bolt 63. A plurality of gear change position detecting contacts 64 are provided at positions on a movement track around a change drum axis O2 of the contact pin 46 in the closing member 59. For example, a contact for detecting the backward position of the change drum 31 and a contact for detecting the neutral position of the change drum 31 serving as the contacts 64 are located at positions corresponding to the backward position and the neutral position of the contact pin 46, respectively. Each of the gear change position detecting contacts 64 is electrically connected to indicators such as lamps for the backward state and the neutral state disposed at meters or the like in the handle grip. Thus, the indicator is lighted at the backward state and the neutral state.

Figure 4:
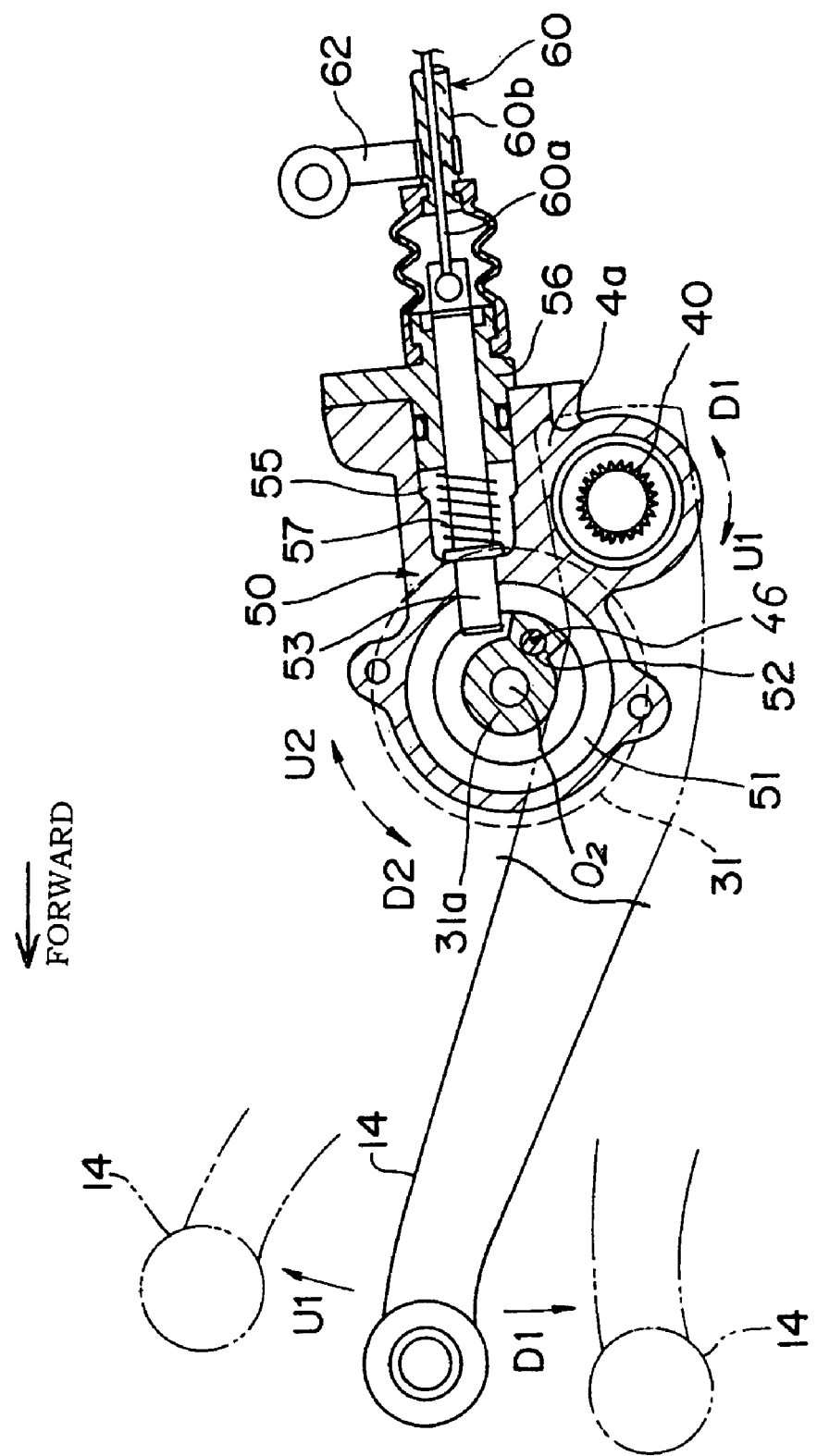
FIG. 4 is a cross-sectional and enlarged view showing a change pedal, the reverse lock device and the change drum in the forward first state, similarly to FIG. 3.

FIG. 4 is a vertical cross-sectional view showing the vicinity of the left end of the change drum 31. The change pedal 14 extending forward is securely fixed to the left end of the change shaft 40. The change shaft 40 is rotated by the predetermined angle in the direction indicated by the arrow D1 by pushing down the change pedal 14, thereby achieving a shift-down operation. To the contrary, the change shaft 40 is rotated by the predetermined angle in the direction indicated by the arrow U1 by pushing up the change pedal 14, thereby achieving a shift-up operation.

[Reverse Lock Device]

In order to prevent any change from the forward first state to the backward state only by the operation of the change pedal 14, a reverse lock device 50 is provided in the vicinity of the left end of the change drum 31. The reverse lock device 50 is configured such that the forward first speed state can be shifted to the backward state by the change pedal 14 only after the reverse lock device 50 is unlocked.

Figure 3:
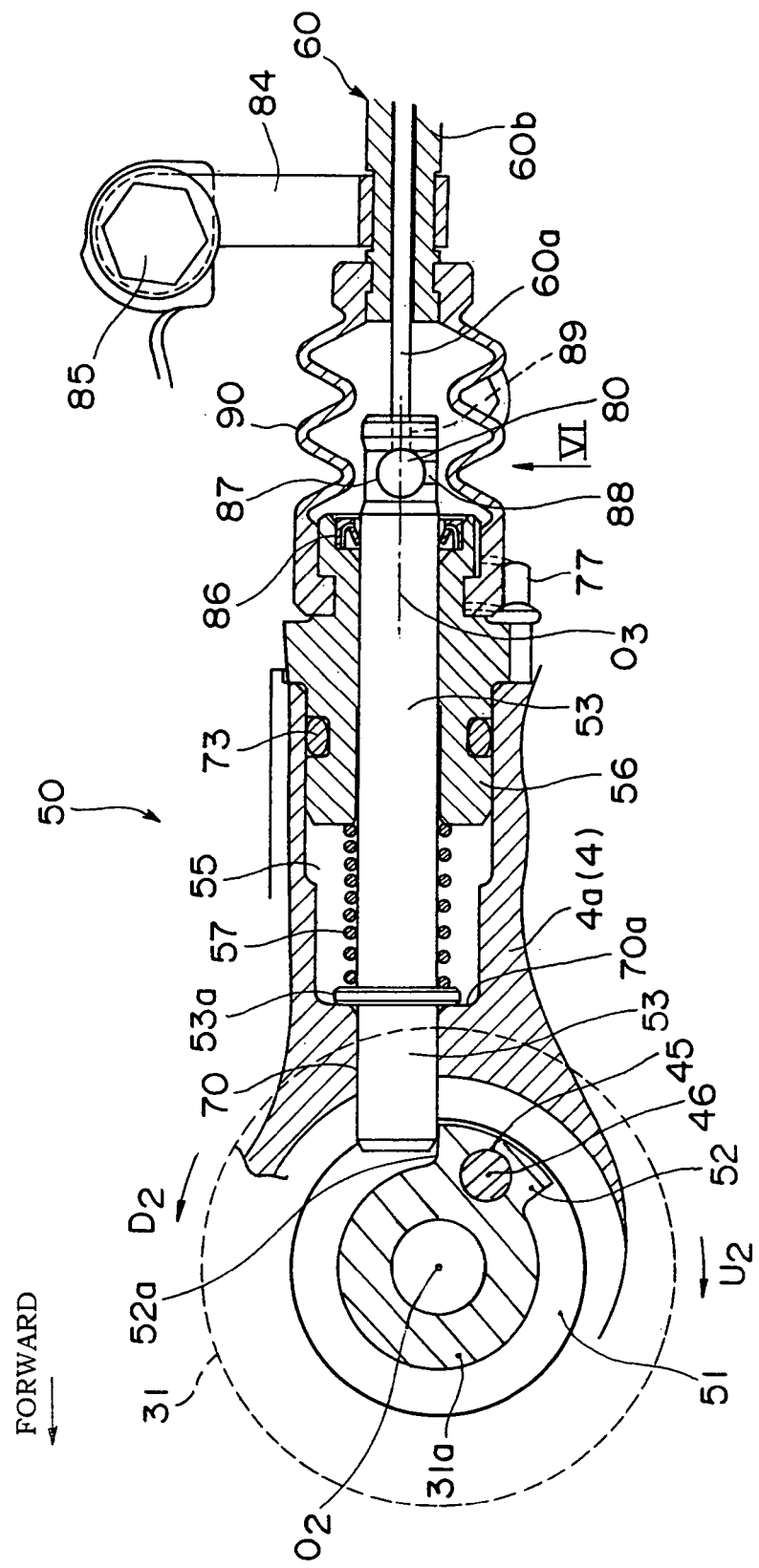
FIG. 3 is a cross-sectional view showing the reverse lock device in a forward first state, taken along a line III-III of FIG. 2.

FIG. 3 is a vertical cross-sectional and enlarged view showing the reverse lock device 50. The reverse lock device 50 is constituted of an arcuate groove 51 formed on the outer peripheral surface of the left shaft end 31a of the change drum 31, a stopper 52 interposed between circumferential end edges of the groove 51, a reverse lock pin 53 capable of projecting into and retreating from the groove 51 in a direction of forward and rearward so as to position in a locking position or an unlocking position, an urging spring 57 for urging the reverse lock pin 53 substantially forward to push the reverse lock pin 53 to the lock position side, a reverse release cable 60 of an unlock force transmission mechanism which pulls the reverse lock pin 53 backward from the lock position to the unlock position against the urging spring 57, and the like. The above-described contact pin 46 is arranged inside of the stopper 52.

On the left side wall 4a of the transmission case 4, a pin inserting hole 70 penetrating substantially in a direction of backward and forward is formed at a position behind the left shaft end 31a of the change drum 31, and further, a boss fixing hole 55 is formed behind the pin inserting hole 70 via a step 70a. A pin supporting boss 56 is fitted into the boss fixing hole 55 via an O-ring 73, to be securely fixed onto the left side wall 4a via a bolt 77. The reverse lock pin 53 is fitted into the pin inserting hole 70 in a manner movable in a pin length direction, that is, substantially in the direction of backward and forward. The rear portion of the reverse lock pin 53 is fitted into the pin supporting boss 56 in a manner movable in the pin length direction, and further, projects rearward from the pin supporting boss 56. One end of an inner wire 60a of the reverse release cable 60 is connected to a rear end of the reverse lock pin 53. A center line O3 of the reverse lock pin 53 is deviated slightly upward from the axis O2 of the change drum 31.

The reverse lock pin 53 integrally has a flange 53a inside of the boss fixing hole 55. The urging spring 57 is contractively disposed between the flange 53a and the fore end surface of the pin supporting boss 56. The reverse lock pin 53 is urged forward by the resiliency of the urging spring 57, and further, the fore end of the reverse lock pin 53 is allowed to project inward of the groove 51. In other words, the reverse lock pin 53 is urged at the lock position.

Figure 5:
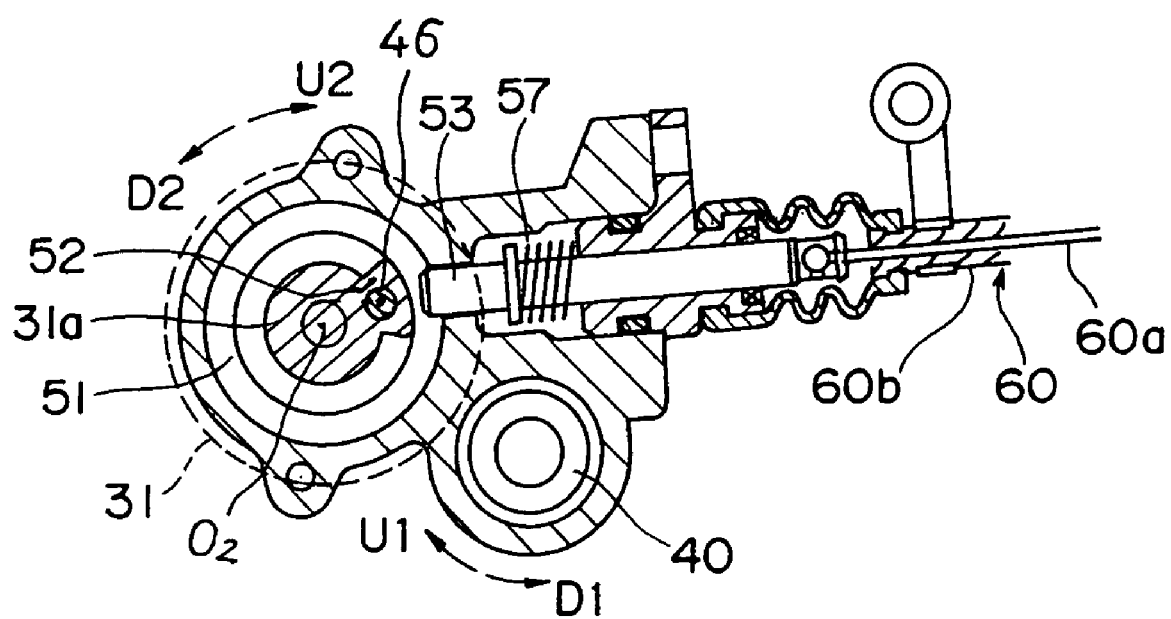
FIG. 5 is a cross-sectional and enlarged view showing the change pedal, the reverse lock device and the change drum in a backward state, similarly to FIG. 3.

FIG. 3 shows the state in which the change drum 31 is located at the forward first speed position responding to the forward first speed state of the gear transmission 11. Here, the stopper 52 is located below in the vicinity of the fore end of the reverse lock pin 53 at the forward first speed position of the change drum 31. As a consequence, the rotation of the change drum 31 from the forward first speed position to the backward position in the direction indicated by the arrow D2 can be prevented by the effect of the engagement between the fore end of the reverse lock pin 53 and a circumferential end surface 52a of the stopper 52. The reverse lock is unlocked by allowing the reverse lock pin 53 to retreat back to an unlock position, as shown in FIG. 5, against the urging spring 57, so that the change drum 31 can be rotated from the forward first speed position to the backward position in the direction indicated by the arrow D2.

[Unlocking Mechanism]

In FIG. 3, the reverse release cable 60 includes an outer tube 60b and the inner wire 60a inserted into the outer tube 60b in a manner movable in a tube length direction. A columnar clasp 80 disposed at the fore end of the inner wire 60a is fitted into a cylindrical locking hole 87 formed at the rear end of the reverse lock pin 53, so that the inner wire 60a and the reverse lock pin 53 are connected to each other. A fore end of the outer tube 60b is supported in a manner immovable in the lengthwise direction by a clamp 84, which is securely fixed onto the left side wall 4a of the transmission case 4 via a bolt 85.

A seal 86 is interposed between the outer peripheral surface at the rear portion of the reverse lock pin 53 and the inner circumferential surface at the rear end of the pin supporting boss 56. Moreover, a bellows dust-proof boot 90 is interposed between an outer peripheral surface at a rear end of the pin supporting boss 56 and the fore end of the outer tube 60b, thereby covering the rear end of the supporting boss 56, the locking hole 87 and the vicinity of a fore end of the inner wire 60a.

The reverse release cable 60 extends to the right handle grip 20, as shown in FIG. 1, to be thus connected to the reverse unlocking lever 22. Specifically, the reverse lock pin 53 shown in FIG. 3 is pulled backward via the reverse release cable 60 by turning the reverse unlocking lever 22, thus unlocking the reverse lock.

Figure 6:
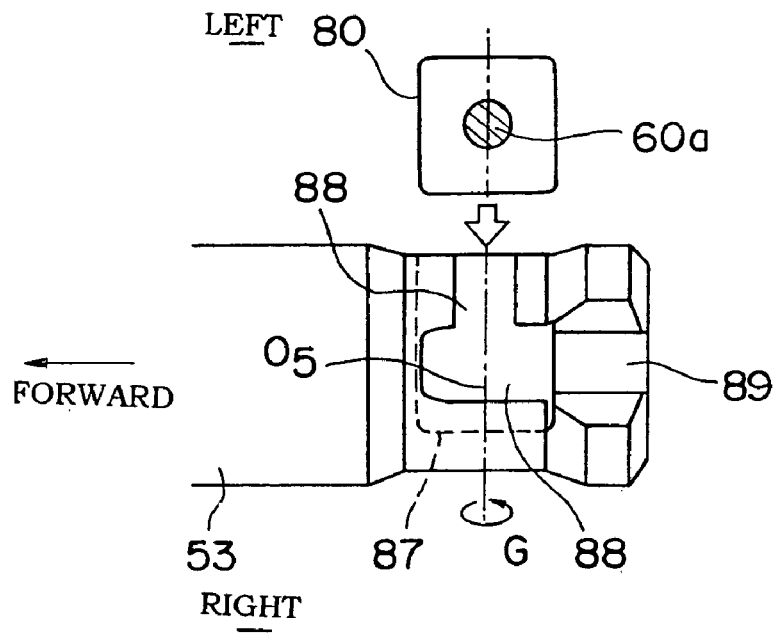
FIG. 6 is an exploded bottom view showing a junction between a reverse lock pin and a transmission cable in the reverse lock device of FIG. 1.
Figure 7:
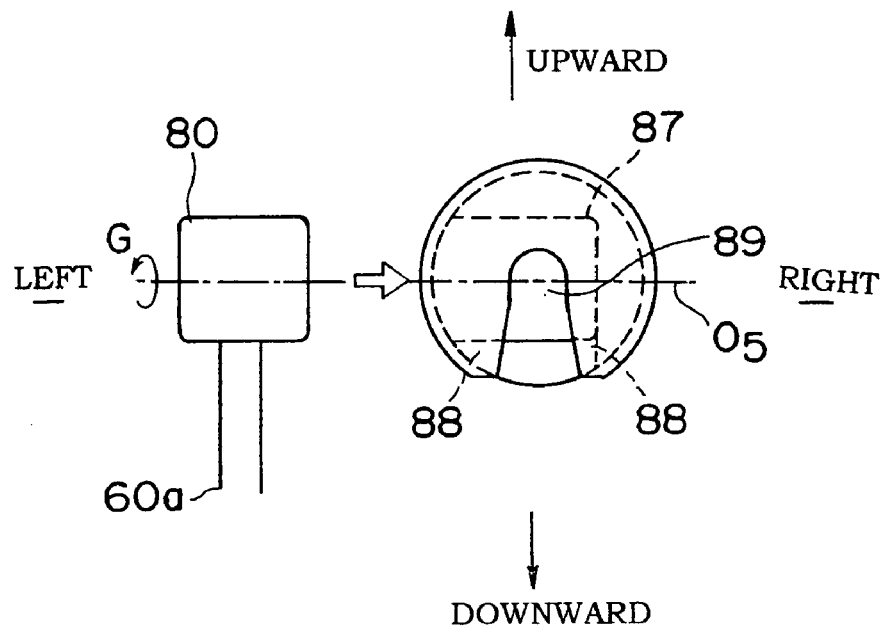
FIG. 7 is an exploded back view showing the junction between the reverse lock pin and the transmission cable in the reverse lock device of FIG. 1.
Figure 8:
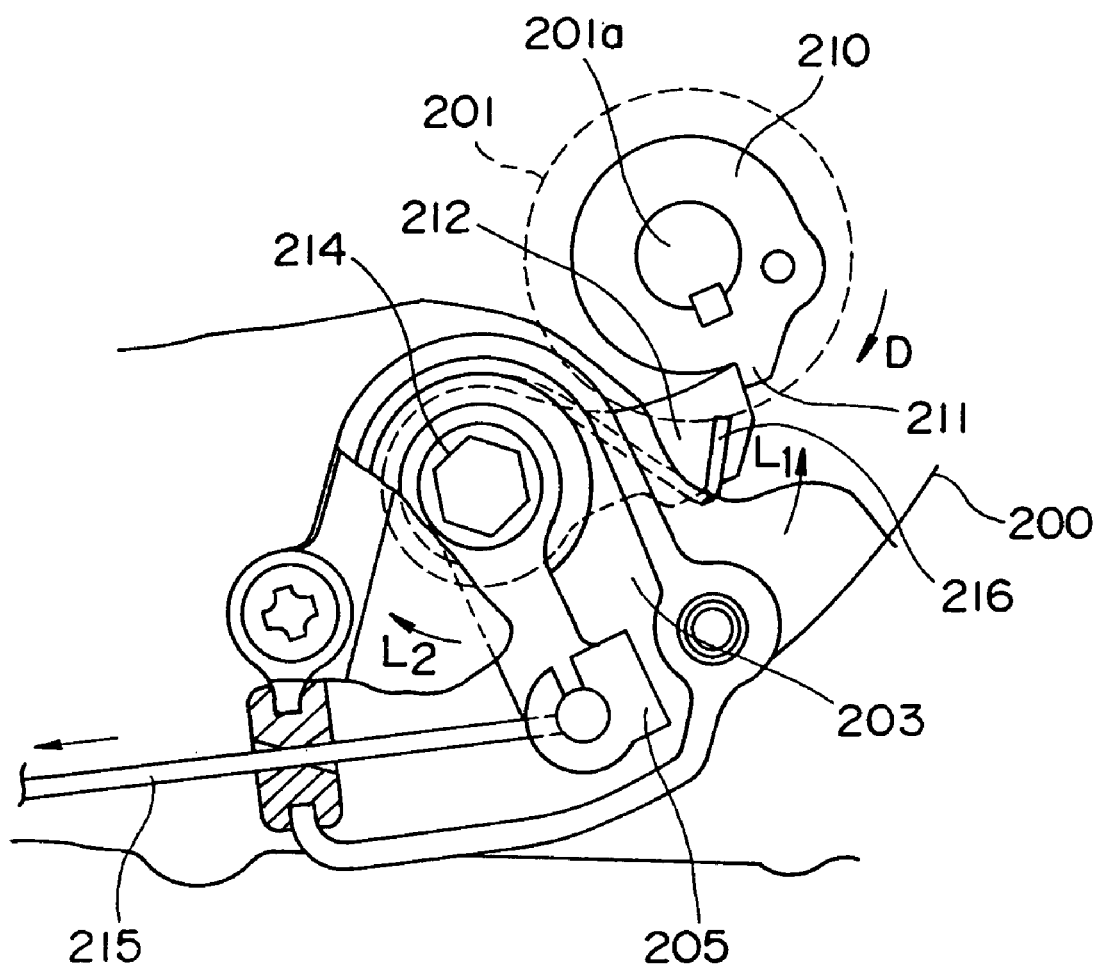
FIG. 8 is a vertical cross-sectional view showing a conventional reverse lock device.

FIG. 6 is an exploded bottom view showing the details of a junction between the reverse lock pin 53 and the inner wire 60a, that is, a view taken along an arrow VI of FIG. 3, and FIG. 7 is a back view of FIG. 6. In FIG. 6, a center line O5 of the cylindrical locking hole 87 formed at the rear end of the reverse lock pin 53 is substantially perpendicular to the lengthwise direction of the reverse lock pin 53. The left end of the locking hole 87 is opened at the left side surface of the reverse lock pin 53: in contrast, the right end of the locking hole 87 is closed. A guide groove 88 is formed into an L shape in bottom view and located under the locking hole 87. The guide groove 88 is opened downward. A wire inserting hole 89 is formed behind the locking hole 87 and is opened downward and is opened backward, as shown in FIG. 7.

The columnar clasp 80 securely fixed at one end of the inner wire 60a is inserted into the locking hole 87 from the left while the inner wire 60a is oriented downward during a connecting operation, as shown in FIG. 7. At this time, the inner wire 60a passes the guide groove 88. Thereafter, the inner wire 60a is moved into the wire inserting hole 89 through the guide groove 88 by rotating the clasp 80 at an angle of 90° in the direction indicated by an arrow G on the center line O5 of the locking hole 87 inside of the locking hole 87, to be thus pulled out rearward, as shown in FIG. 3.

(Functions)

When the neutral state of the gear transmission 11 is shifted to the forward first speed state during the halting state of the vehicle, the clutch is disconnected by gripping the clutch lever 26 shown in FIG. 1 by a left hand of the rider, and further, the brake is activated by gripping the front brake lever 21 by a right hand of the rider. In addition, the change pedal 14 shown in FIG. 4 is pushed down in the direction indicated by the arrow D1, and further, the change drum 31 is rotated from the neutral position to the forward first speed position, as shown in FIG. 4, in the direction indicated by the arrow D2. Here, the contact pin 46 shown in FIG. 3 is brought into contact with the neutral contact 64 in the neutral state, and therefore, the neutral lamp of the indicator is lighted.

Thereafter, even when the change pedal 14 is to be further pushed down in the direction indicated by the arrow D1, the rotation of the change drum 31 in the direction indicated by the arrow D2 can be prevented by the abutting of the stopper 52 against the tip of the reverse lock pin 53. In other words, it is possible to prevent any erroneous shift to the backward state.

In the case where the gear transmission is further shifted up after shifting to the forward first speed state, the change pedal 24 is pushed up in the direction indicated by the arrow U1, and further, the change drum 31 is rotated at every predetermined angle in the direction indicated by the arrow U2, thereby shift the gear transmission 11 to the forward second speed state, the forward third speed state, the forward fourth speed state and the forward fifth speed state in sequence.

In the case where gear the transmission 11 is shifted down, the change pedal 14 is pushed down in the direction indicated by the arrow D1, and further, the change drum 31 is rotated at every predetermined angle in the direction indicated by the arrow D2. Even when the change pedal 14 is to be further pushed down after the shift-down to the forward first speed state, the rotation of the change drum 31 in the direction indicated by the arrow D2 can be prevented by the abutting of the stopper 52 against the reverse lock pin 53. In other words, it is possible to prevent any erroneous switch to the backward traveling gear.

When the neutral state of the gear transmission 11, for example, is shifted to the backward state during the halting state of the vehicle, the reverse lock pin 53 shown in FIG. 4 is allowed to retreat back to the unlock position shown in FIG. 5 against the spring 57 by gripping the clutch lever 26 shown in FIG. 1 by the left hand, gripping the front brake lever 21 by the right hand, and further, pushing the reverse unlocking lever 22 by the thumb of the right hand. In this state, the change drum 31 is rotated from the forward first position to the backward position in the direction indicated by the arrow D2 by pushing down the change pedal 14, thereby shifting the gear transmission 11 to the backward state. The contact pin 46 shown in FIG. 3 is brought into contact with the backward contact 64 in the backward state, and therefore, the backward lamp of the indicator is lighted.

When the thumb of the rider is released from the reverse unlocking lever 22 after the gear transmission is shifted to the backward state once, the fore end of the reverse lock pin 53 shown in FIG. 5 abuts against the outer peripheral surface of the stopper 52 by the effect of the spring 57.

When the gear transmission 11 is shifted from the backward state to the neutral state, it is unnecessary to operate the reverse unlocking lever 22. The change drum 31 is first returned from the backward position to the forward first speed position by disconnecting the clutch and pushing up the change pedal 14 in the direction indicated by the arrow U1. At this time, the reverse lock pin 53 automatically projects inward of the groove 51 up to the lock position by the resiliency of the spring 57. Subsequently, the change drum 31 is returned to the neutral position by pushing up the change pedal 14 in the direction indicated by the arrow U1.

Effects of Preferred Embodiment (1) The reverse lock pin 53 is disposed substantially perpendicularly to the axial direction of the change drum 31, and further, is configured in a manner slidable in the pin length direction so as to lock to or unlock itself from the stopper 52, thus reducing the number of component parts for the reverse lock device, reducing the installation space, reducing the size and weight of the engine.

(2) The reverse lock pin 53 is inserted directly into the pin inserting hole 70 formed on the side wall 4a of the transmission case 4, thus also reducing the number of component parts for supporting the reverse lock pin 53. In addition, the stopper 52 is disposed directly at the shaft end 31a of the change drum 31, thus making it unnecessary to additionally dispose another component part for the stopper, so as to further reduce the number of component parts.

(3) The stopper 52 is disposed at the shaft end 31a of the change drum 31, and further, the contact pin 46 for detecting the gear change position is supported by the stopper 52, thus further reducing the number of component parts and rendering the engine more compact.

(4) The reverse lock pin 53 is urged at the lock position by the spring 57, to be thus automatically returned to the reverse lock state without performing any special operation when the transmission is switched from the backward traveling gear to the forward traveling gear or the neutral gear.

(5) The spring accommodating chamber 55 formed on the side wall 4a shown in FIG. 3 is sealed by the O-ring 73, and further, is sealed also by the seal 86, so that lubricant oil or the like is prevented from leaking to the outside even when the lubricant oil or the like enters the spring accommodating chamber 55 through the pin inserting hole 70 from the transmission case 4.

Other Preferred Embodiments (1) The reverse lock pin is disposed along substantially the forward and backward direction of the vehicle in the above-described preferred embodiment. However, according to the present invention, the reverse lock pin may be disposed along a vertical direction, may be inclined up backward or up forward as long as the reverse lock pin is substantially perpendicular to the axial direction of the change drum.

(2) The inserting hole 70 for the reverse lock pin is formed directly on the side wall 4a of the transmission case 4 in the above-described preferred embodiment. However, a pin inserting hole may be formed in a member independent of the side wall 4a, and then, the independent member may be securely fixed onto the side wall 4a.

(3) The stopper 52 is formed integrally with the change drum 31 in the above-described preferred embodiments. However, the stopper 52 formed as a member independent of the change drum 31 may be securely fixed to the change drum.

(4) The unlocking transmission mechanism is not limited to the cable transmission mechanism. Therefore, a transmission mechanism may be provided by using a rod.

(5) The present invention is not limited to the above-described preferred embodiments, and therefore, encompasses various modifications within the scope without departing from the spirit of the invention as defined in the appended claims.

What is claimed is:

1. A straddle-type four wheeled vehicle including: a gear transmission capable of changing a gear arrangement among a forward state and a backward state; a change drum disposed substantially in parallel to a crankshaft of an engine and rotating at every predetermined angle to change the gear arrangement of the gear transmission; and a reverse lock device;

the reverse lock device comprising:

a stopper rotated integrally with the change drum;

a reverse lock pin disposed substantially perpendicularly to an axial direction of the change drum and capable of moving in a direction of a pin length between a lock position, at which the reverse lock pin locks the stopper so as to prevent the change drum from rotating to a backward position of the change drum, and an unlock position, at which the reverse lock pin unlocks the stopper; and an unlocking force transmission mechanism for moving the reverse lock pin to the unlock position, wherein the reverse lock pin is inserted into a pin inserting hole formed on a side wall of a transmission case which houses the gear transmission therein, wherein an axial end of the change drum has a projection which projects in an axial direction from a bearing for supporting the change drum, the projection having the stopper.

2. The straddle-type four wheeled vehicle as claimed in claim claim 1, wherein a contact for detecting a gear change position is disposed at an axial end surface of the projection.

* * * * *